Patented Oct. 14, 1930

1,778,076

UNITED STATES PATENT OFFICE

RICHARD HERZ, OF FRANKFORT-ON-THE-MAIN, FRANZ FARR, OF FECHENHEIM, NEAR FRANKFORT-ON-THE-MAIN, AND KARL THIESS AND CARL JOSEF MÜLLER, OF HOCHST-ON-THE-MAIN, GERMANY, ASSIGNORS TO GENERAL ANILINE WORKS, INC., OF NEW YORK, N. Y., A CORPORATION OF DELAWARE

HALOGENATED AMINOTHIONAPHTHENE-2.3'-INDOLE-INDIGOID DYESTUFFS

No Drawing. Application filed February 4, 1928, Serial No. 252,038, and in Germany February 14, 1927.

Our present invention relates to new vat dyestuffs of the 2-thionaphthene-3-indolindigo series and process of preparing them.

We have found that dyestuffs of valuable tinctorial properties are obtained by condensing 6-amino-keto-thionaphthene with a 5.7-dihalogenisatin and introducing two chlorine atoms into the 5.7-position of the thionaphthene side, or by condensing 5.7-dichlor-6-amino-keto-thionaphthene with a 5.7-dihalogenisatin. The dyeings produced by means of these new dyestuffs have over the brown dyestuffs described in U..S. A. specification No. 968,697 the advantages of a much purer shade and of a better fastness to kier-boiling and to light.

We have furthermore found that the said new dyestuffs can be obtained by chlorinating the condensation products from 6-amino-keto-thionaphthene and 5.7-dihalogenisatins with sulfuryl chloride. It is thus possible to introduce the chlorine uniformly into the 5 and 7 position of the keto-thionaphthene side. This result could not be expected, since when chlorinating 6-amino-2-thionaphthene-3-indolindigo which has not yet a halogen in the indol residue, heterogeneous dyestuffs are obtained with a bad yield which cannot be used for dyeing purposes.

The chlorination can be carried out with or without using an indifferent diluent.

The 5.7-dichloro-6-amino-keto-thionaphthene can be prepared by treating 2-amino-4.6-dichloro-5-acetlamino-1-thioglycollic acid according to the process described in German Patents Nos. 184496, 190291, 190074 and 202696 or by treating 4-amino-2.6-dichloracetanilide according to the process described in German Patents Nos. 360690, 364822 and 367493.

The following examples illustrate our invention, but they are not intended to limit it thereto; the parts are by weight:

1. 16.5 parts of 6-amino-keto-thionaphthene are dissolved hot in 200 parts of glacial acetic acid and, if necessary, filtered. After the addition of 30.5 parts of 5.7-dibromisatin and of a slight quantity of concentrated hydrochloric acid, the mass is heated on the steam bath, while stirring, until no free 6-amino-keto-thionaphthene can be detected. The reaction probably takes the following course:

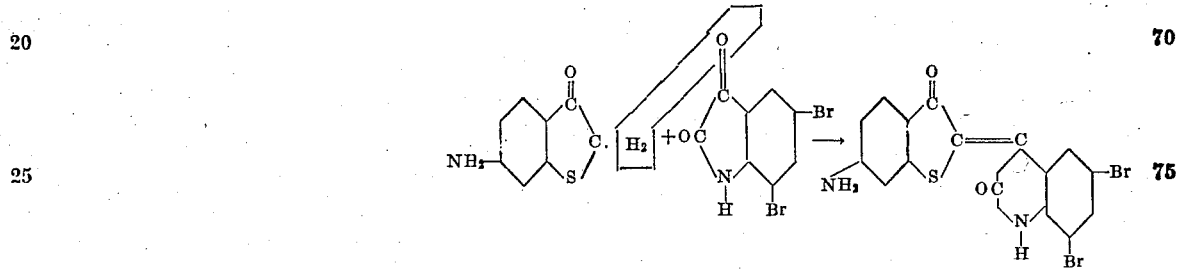

It is then filtered hot, washed first with glacial acetic acid and afterwards with water until there is a neutral reaction, and dried. 45.2 parts of the condensation product thus obtained are suspended in 500 parts of chlorobenzene and to this suspension are added at 30° C. 30 parts of sulfuryl chloride. The mass is first stirred at 30° C. for two hours, then gradually heated to 70° C., kept at this temperature for 5 to 6 hours, allowed to cool and filtered. The dyestuff thus produced is freed from the chlorobenzene still adhering to it by means of steam and finally dried.

It is a brown powder dissolving in concentrated sulfuric acid to a reddish-violet solution which becomes pure red when allowed to stand for some time. It dyes cotton from a yellow hydrosulfite vat pure yellowish-brown tints which are distinguished by their very good fastness to washing and light.

The dyestuff has the following formula:

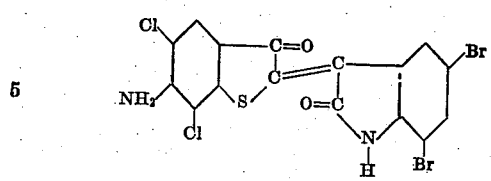

2. 16.5 parts of 6-amino-keto-thionaphthene are suspended with 21.6 parts of 5.7-dichlorisatin in 400 parts of alcohol and after having added thereto 1 part of calcined sodium carbonate, the whole is heated to boiling for 4 to 5 hours. The condensation product which separates is filtered while hot, washed with a small quantity of alcohol and dried.

36.3 parts of the 6-amino-2-thionaphthene-5.7-dichloro-3-indolindigo thus obtained are suspended in 300 parts of commercial dichlorobenzene and gradually heated, while stirring, to 70° C. to 80° C. together with 30 parts of sulfuryl chloride. After being heated at this temperature for about 6 hours the mass is allowed to cool, filtered and washed with a small quantity of alcohol. The dichlorobenzene which is still adhering to it is then eliminated by means of steam.

The dyestuff forms when dry a brown powder and is soluble in sulfuric acid to a wine-red solution. It dyes cotton from a yellow hydrosulfite vat clear brown tints which are somewhat redder than those obtainable according to the preceding example.

The dyestuff has the following formula:

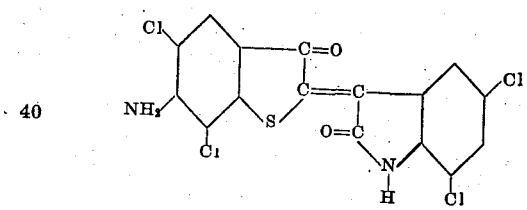

3. 23.4 parts of 5.7-dichlor-6-amino-keto-thionaphthene are dissolved in 200 parts of glacial acetic acid, 30.5 parts of 5.7-dibromisatin and a small quantity of concentrated hydrochloric acid are added to this solution and the whole is heated on the steam bath for about one hour. The dyestuff which separates is filtered while hot and washed with water until neutral. It is identical with that obtainable according to Example 1.

We claim:

1. As new products vat dyestuffs of the following composition:

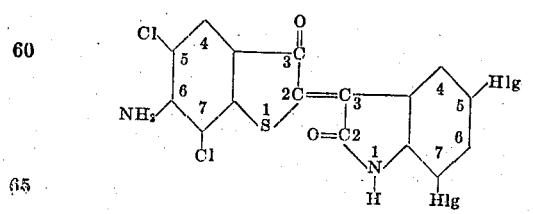

2. As a new product the vat dyestuff of the following composition:

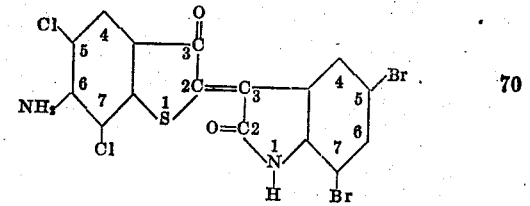

3. Process of producing vat dyestuffs, which consists in treating the dyestuff of the following composition:

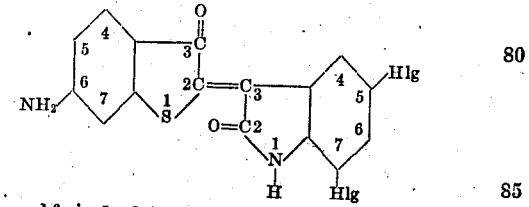

with sulfuryl chloride.

4. The process of producing vat dyestuffs, which consists in treating the dyestuff of the following composition:

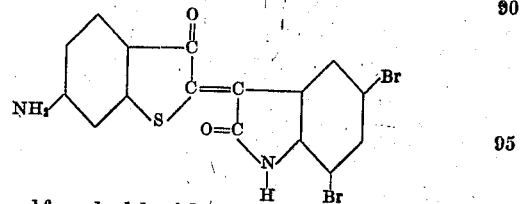

with sulfuryl chloride.

5. The process of producing vat dyestuffs, which consists in treating the dyestuff of the following composition:

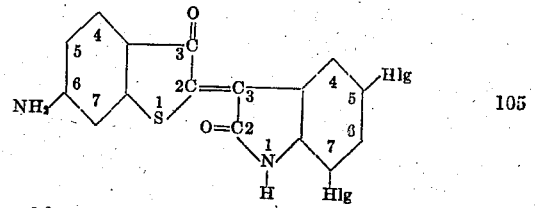

with sulfuryl chloride in the presence of an indifferent diluent.

6. The process of producing vat dyestuffs, which consists in treating the dyestuff of the following composition:

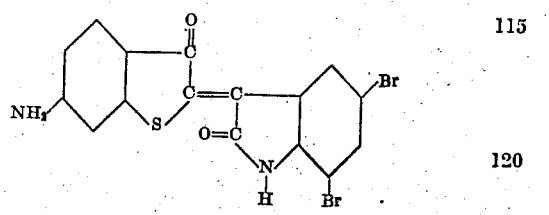

with sulfuryl chloride in the presence of an indifferent diluent.

In testimony whereof, we affix our signatures.

RICHARD HERZ.
FRANZ FARR.
KARL THIESS.
CARL JOSEF MÜLLER.